H. P. WESTCOTT.
DIRT COLLECTOR FOR PROPORTIONAL METERS.
APPLICATION FILED JUNE 21, 1910.
1,005,088.
Patented Oct. 3, 1911.
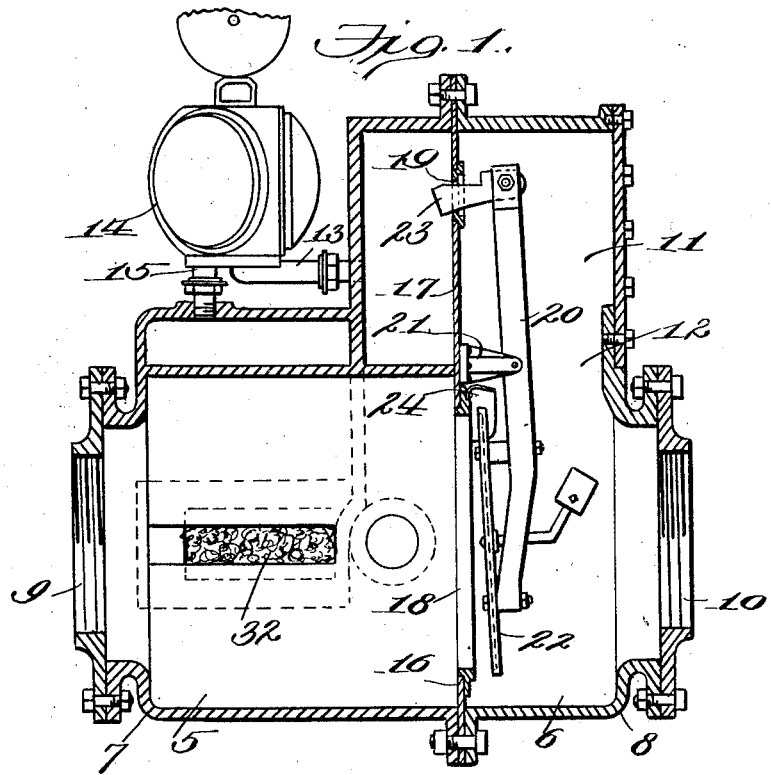
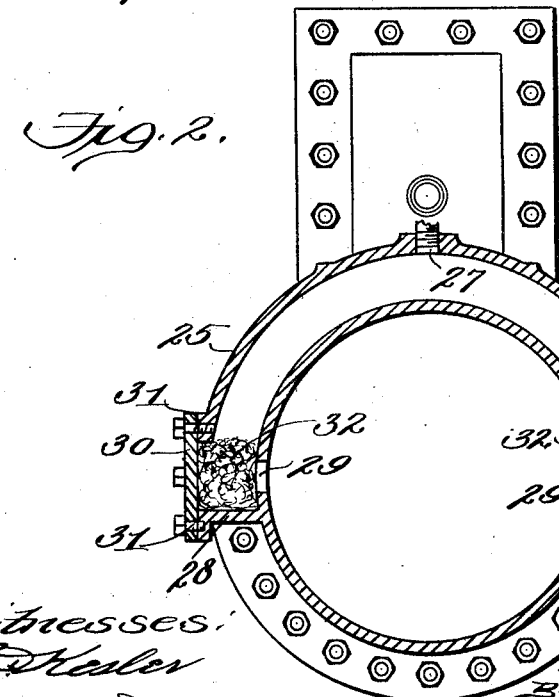

UNITED STATES PATENT OFFICE.

HENRY P. WESTCOTT, OF ERIE, PENNSYLVANIA.

DIRT-COLLECTOR FOR PROPORTIONAL METERS.

1,005,088. Specification of Letters Patent. Patented Oct. 3, 1911.

Application filed June 21, 1910. Serial No. 568,146.

*To all whom it may concern:*

Be it known that I, HENRY P. WESTCOTT, a citizen of the United States, residing at Erie, in the county of Erie and State of Pennsylvania, have invented new and useful Improvements in Dirt-Collectors for Proportional Meters, of which the following is a specification.

This invention relates to a dirt and sediment collector for proportional meters and forms a part of the meter organization and is continually in position to perform its function. There is always more or less dirt, grease, oil, water or other residuum in the gas flowing into a meter and under these conditions the tally mechanism and the proportional valve are liable to a deposit of the dirt or other material carried by the gas and as a consequence inaccurate measurement ensues.

The primary object of the invention, therefore, is to entirely clean the proportional volume of gas of dirt, grease, oil, water or other residuum carried thereby prior to its entrance to the tally mechanism and proportional chamber so as to preserve constancy in accuracy of measurement of the proportional volume of gas and a reliable operation of the meter as a whole.

A further object of the invention is to provide means for causing the proportional volume of the gas to have a comparatively slow movement through the cleaning means en route to the tally mechanism to lessen the possibility of clogging or stoppage of the cleaning devices and to insure separation of deleterious matter, such as dirt, grease, etc., from the proportional volume of gas.

With these and other objects and advantages in view, the invention consists in the preferred construction and arrangement which will be more fully hereinafter explained and subject to such modifications as are fairly contemplated by the scope of the invention.

In the drawing: Figure 1 is a longitudinal vertical section of a portion of a meter embodying the features of the invention and showing the tally mechanism in side elevation. Fig. 2 is a transverse vertical section through the inlet chamber of the meter and showing the cleaning means and passage for the proportional volume of gas from said chamber to the tally mechanism, the tally mechanism being removed.

The numerals 5 and 6 respectively designate the inlet and outlet chambers of a proportional meter, the said chambers being formed by the end-to-end association of bowls 7 and 8, the chamber 5 having a threaded inlet opening 9 and the chamber 6 having a threaded outlet opening 10. A proportional chamber 11 is mounted on or disposed over the two chambers 5 and 6 and has continuous communication with the chamber 6 through the medium of an opening 12 and indirect communication with the chamber 5 by means of a pipe 13 through tally mechanism 14 supported over the said chamber 5 and having a pipe connection 15 for passage of the proportional volume of gas from the said chamber 5 through the tally mechanism 14 and into the proportional chamber 11. The inlet and outlet chambers 5 and 6 are separated by a partition 16 which extends upwardly through and divides the proportional chamber 11 as at 17. The partition 16 has an enlarged main valve opening 18 therein for the purpose of establishing communication between the chambers 5 and 6, and the portion of said partition dividing the proportional chamber 11 has a proportional valve opening 19 therein. A rocking lever 20 is supported by an intermediate fulcrum means 21 on the partition 16 and on the lower extremity of this lever a weighted main valve 22 is secured and normally closes the opening 18, the said valve being held open by a predetermined pressure of the main volume of gas passing from the chamber 5 to the chamber 6.

On the upper extremity of the lever 20 a proportional valve 23 is secured and is projected through and moves in the opening 19 and controls the size of the latter opening by its operation or movement which is in proportion to the movement of the valve 22 by the gas pressure. Over the upper portion of the main valve opening 18 is a fixed shield or guard 24 which avoids interference with the flow of the gas from the opening 18 to the opening 10 by eddies that might otherwise be formed by counter-currents set up by gas coming from the proportional chamber. The main valve 22 and proportional valve 23 as well as the proportional chamber and tally mechanism 14 operate in all respects similar to the chambers 5 and 6 as fully explained in my copending application Serial Number 435,820, filed May 29, 1908.

The upper portion of the bowl 7 is formed with an outer shell 25 to provide a passage 26 wholly unobstructed between the cleaning means hereinafter explained and the top central portion where an outlet opening 27 is formed for the reception of the lower end of the pipe 15 forming the means of communication between the said passage and the chamber 5 and the tally mechanism 14. The passage 26 has bottom closures 28 below the horizontal diameter of the bowl 7 and slightly above said closures the bowl 7 has diametrically opposed openings 29 formed therein and serving as the communicating means between the interior of the bowl or the chamber 5 and the passage 26. Cleaning chambers are formed at the lower extremities of the passage 26 adjacent to the openings or ports 29 by the bottom closures 28 and outer removable cover plates 30 separably secured by bolts 31 to the closures and the lower terminals of the outer shell 25, the said cover plates rendering the cleaning chambers accessible from the exterior of the bowl 7. Within the cleaning chambers suitable filtering or cleaning material 32 is disposed and it has been found that sponges have a more satisfactory operation than any other material. The cleaning material or sponges 32 is closely packed or held against the openings 29, as clearly shown by Fig. 2, and said openings are elongated to provide practical outlets from the chamber 5 to the passage 26 and to expose a comparatively large area of the cleaning material or sponges. When found necessary the cleaning material or sponges 32 may be removed and replaced by new material of a similar character at a minimum expense.

The proportional volume of gas passes through the openings or ports 29 from the inlet chamber 5 and also through the cleaning material or sponges 32, the latter cleaning or purifying the gas by taking up dirt, grease, oil, water or other residuum carried thereby, and from the cleaning material the gas flows into and through the passage 26 and from the latter to the tally mechanism and thence to the proportional chamber, first passing through the opening 19 and then through the opening 12 into the outlet chamber 6. The areas of the openings or ports 29 and of the passage 26 are materially greater than the outlet opening 27 through the medium of which and the pipe 15 communication with the tally mechanism 14 is established, and by reason of this difference in size of the openings 29, passage 26 and outlet opening 27, the proportional volume of gas is given a slower speed in its travel to the tally mechanism with the result that it will be more effectively cleaned by the material 32 with less possibility of clogging or stopping up of the latter, and, further, the slower the volume of gas passes through the openings 29 into the passage 26, the less dirt and sand will be carried thereby. The passage 26 also serves to permit the deposit of any dirt or residuum that may be carried by the volume of gas after passing through the cleaning material and thus acting as a trap. At any time desired the passage 26 may be cleaned by removing the cover plates 30 and the cleaning material or sponges 32.

As hereinbefore indicated, the subjection of the proportional volume of gas to a cleaning operation will reduce the deposit of material carried by the gas under other conditions in the tally meter or mechanism and on the proportional valve with the result that the registration or measurement of the proportional volume will constantly ensue with accuracy.

What is claimed is:

1. In a meter of the class specified, inlet, outlet and proportional chambers, automatically operating valves controlling communication between the inlet and outlet chambers and between different portions of the proportional chamber, a tally mechanism having means communicating with opposite portions of the inlet chamber and also provided with means communicating with the proportional chamber, and cleaning instrumentalities located in the means communicating with the opposite portions of the inlet chamber and between the latter and the tally mechanism for purifying the proportional volume of gas passing from the opposite portions of the inlet chamber to the tally mechanism.

2. In a meter of the class specified, the combination with inlet and outlet chambers, a proportional chamber, and tally mechanism having means communicating with opposite portions of the inlet chamber and also provided with means communicating with the proportional chamber and cleaning instrumentalities between the said inlet chamber and said tally mechanism.

3. In a meter of the class specified, an inlet chamber having a passage-way over a portion of the same communicating with said chamber by means of opposed openings, cleaning means adjacent to said openings, an outlet chamber, a proportional chamber communicating with the outlet chamber, a valve controlling communication between the inlet and outlet chambers and another valve controlling communication between different portions of the proportional chamber, and tally mechanism interposed between the said passage and proportional chamber for receiving a cleaned proportional volume of gas from the passage and delivering it to the proportional chamber.

4. In a meter of the class specified, the combination of inlet and outlet chambers, the inlet chamber having a passage thereover and openings communicating with said passage, cleaning material disposed adjacent to said openings, a proportional chamber communicating with the outlet chamber, and tally mechanism communicating with the passage and proportional chamber, the openings between the passage and inlet chamber having a materially greater area than the communicating opening between the passage and tally mechanism for reducing the speed of flow of the proportional volume of gas on its way to the tally mechanism.

5. In a meter of the class specified, the combination of inlet and outlet chambers, the inlet chamber having a passage exterior thereof and openings therein communicating with said passage, cleaning material disposed in the passage, a proportional chamber communicating with the outlet chamber, and tally mechanism having means communicating with the passage and also provided with means communicating with the proportional chamber, the openings between the passage and inlet chamber having a materially greater area than the communicating opening between the passage and tally mechanism for reducing the speed of flow of the proportional volume of gas on its way to the tally mechanism.

6. In a meter of the class specified, the combination of inlet and outlet chambers, a proportional chamber communicating with the outlet chamber, a tally mechanism communicating with the proportional chamber, a conduit between the inlet chamber and the tally mechanism, the opening between the tally mechanism and conduit being smaller than the opening between the inlet chamber and conduit, and cleaning means disposed in the said conduit.

In testimony whereof I have hereunto set my hand in presence of two subscribing witnesses.

HENRY P. WESTCOTT.

Witnesses:
 A. B. GALLAGHER,
 C. G. PRIOR.

---

Copies of this patent may be obtained for five cents each, by addressing the "Commissioner of Patents, Washington, D. C."